United States Patent [19]

Albanese et al.

[11] 4,241,347
[45] Dec. 23, 1980

[54] PRC/FM CW RADAR SYSTEM

[75] Inventors: Damian F. Albanese; Albert M. Klein, both of Chatsworth, Calif.

[73] Assignee: International Telephone and Telegraph Corporation, New York, N.Y.

[21] Appl. No.: 919,910

[22] Filed: Jun. 28, 1978

[51] Int. Cl.² .................. G01S 9/233; G01S 9/24
[52] U.S. Cl. .................... 343/9 R; 343/14; 343/17.2 PC
[58] Field of Search ............. 343/14, 17.5, 9, 17.2 PC

[56] References Cited
U.S. PATENT DOCUMENTS

| 3,109,172 | 10/1963 | Hardinger et al. | 343/14 |
| 3,188,635 | 6/1965 | Blythe | 343/14 |
| 3,372,391 | 3/1968 | Lerner | 343/14 |
| 3,824,592 | 7/1974 | Mehltretter | 343/14 |
| 3,874,296 | 4/1975 | Hedemark | 343/14 |
| 4,106,018 | 8/1978 | Chihak et al. | 343/14 |

Primary Examiner—T. H. Tubbesing
Attorney, Agent, or Firm—William T. O'Neil

[57] ABSTRACT

An FM-CW radar system with improved range discrimination and improved immunity to clutter, chaff, jamming and multiple target environments. The FM-CW apparatus involves a repetitive cycle including a first, constant-transmitted-frequency (monochromatic) transmission, a linear frequency upsweep as a second period and a linear frequency downsweep as a third period within each transmission frame. Pseudorandom coding is superimposed on the FM-CW waveform, a code word duration being selected to place the first Doppler ambiguity beyond the highest expected equivalent target velocity. The resulting range ambiguities are resolved by means of the unambiguous range-determining capability of the FM-CW feature.

14 Claims, 9 Drawing Figures

FIG. 1 PRIOR ART
SIMPLIFIED FM-CW RADAR

FIG. 2
FM-CW MODULATION FRAME LEGEND

FIG. 3
FM-CW RADAR 2-DIMENSIONAL AMBIGUITY DIAGRAM

FIG. 4
MONOCHROMATIC C-W MODE

FIG. 5
FM RAMP MODE

FIG. 6
MONOCHROMATIC C-W MODE
(WITH RANGE DISCRIMINATION)

FIG. 7
FM. RAMP MODE
(WITH RANGE DISCRIMINATION)

FIG. 8 PRIOR ART
PRC RADAR SYSTEM

FIG. 9 SIMPLIFIED PRC/FM RADAR

4,241,347

PRC/FM CW RADAR SYSTEM

BACKGROUND OF THE INVENTION

1. Field of the Invention

The invention relates to radar systems generally and, more particularly, to the so-called FM-CW type radar systems.

2. Description of the Prior Art

Unlike pulsed radar systems, which rely on direct-time measurement between transmission and return of an echo to effect range-determination, CW-type radars must use other ranging methods. Many such CW radars, both monostatic and multistatic types, utilize an FM/CW waveform to make range and range-rate (velocity) measurements, the latter by relying on the Doppler effect. The waveform generally consists of monochromatic (unmodulated) CW during a portion of the transmitted frame. During that time, the target Doppler measurement may be made. Subsequently, one or two frequency-modulated ramps are transmitted, during which the range measurement is made.

During the aforementioned monochromatic transmission, there is, of course, no range discrimination. Accordingly, target Doppler measurement may be corrupted or may be impossible to make in the environment of interference. Such interference might be clutter (moving or stationary) which overlaps the target area. Quite obviously, it would be beneficial therefore if, during the monochromatic mode, some range discrimination could be obtained to eliminate or greatly diminish the effect of the interference on the Doppler measurement. During the FM ramp portion of a CW radar transmission, there inherently is coupling between the target range and Doppler measurements. Again, in many cases, this results in large interference signals, even though the cause of such interference signals is significantly removed in range and velocity from the target. Again, the result may be to corrupt or completely mask the target measurement.

In the text, RADAR HANDBOOK, by Merrill I. Skolnick (McGraw-Hill Book Company, 1970), the subject of CW and FM radar systems is well summarized in Chapter 16. The matters of Doppler and range determination are explored therein.

Some other references of particular interest in connection with the prior art, especially the pseudo-random code aspects of the combination are in the patent literature. In particular, U.S. Pat. No. 4,042,925 describes radar using a triple-clock (staggered) bit rate for resolving range ambiguities in a pseudo-random surveillance system. From that patent, additional information about the prior art pseudo-random coded radar system configurations can be appreciated. Still further, U.S. Pat. Nos. 3,816,829 and 4,012,737 are of interest in respect to certain prior art aspects of the overall combination shown.

Certain aspects of the FM-CW radar prior art are described hereinafter under Detailed Description, since detailed information thereon is required in order to adequately explain the novel combination of the invention.

It is well known that the conventional prior art FM-CW radar suffers from certain limitations and disadvantages by itself. A more detailed description of those disadvantages, relying on certain of the drawings herewith, will be undertaken in the Detailed Description to follow. It is sufficient here to say that in prior art FM-CW radar system, received signals in various combinations of range and Doppler may be detected ambiguously, this giving rise to a range-Doppler coupling problem. For example, a patch of clutter at zero Doppler and finite range greater than zero can energize the same final filter as a target at a finite Doppler greater than zero and a different range.

It is well known to use banks of filters to separate the Doppler components of various targets, as well as to provide range discriminating detection in the ordinary known FM-CW system. Where the frequency modulation function is linear, as it ordinarily is, the frequency of an echo signal differs from the instantaneous FM ramp frequency by an amount proportional to range. Matched filtering, therefore, is a well known concept for the purpose of range determination in such systems.

The manner in which the present invention overcomes the disadvantages and limitations of conventional FM-CW radar systems will be understood as this description proceeds.

SUMMARY

According to the invention, an FM-CW radar system is provided which includes apparatus for effecting PRC (pseudo-random coded) biphase modulation of the transmitted carrier in addition to the FM ramp waveform, the latter provided in accordance with the well-known FM-CW radar format. Since the system is basically linear, either the PRC modulation or the FM-CW format can be first imposed on the transmitted frequency, although for sake of this description, it is assumed that the PRC bi-phase modulation is applied after the FM-CW format is generated. Thereafter, appropriate radio frequency power amplification is provided in addition to a transmitting antenna.

Unlike pulsed radar, wherein the time between relatively short-duration transmitted pulses is entirely devoted to receiving, a CW radar system requires contemporaneous transmission and reception and, therefore, ordinarily involves two antenna systems directed to cover essentially the same sector of space. Although it is possible to conceive of hybrid antenna arrangements for simultaneous transmission and reception over a common antenna, such apparatus would not be a part of the present invention and, accordingly, is not described or disclosed herein. It is assumed, for example, that separate transmitting and receiving antennas are contemplated.

The PRC modulation is applied in accordance with the well-known biphase technique, although it is pointed out that pseudo-random coding can be applied in other modulation forms. However, the biphase modulation contemplated is both simple and effective and can be instrumented in accordance with well-understood conventional circuits.

Upon reception by the receiving antenna, echo signals from targets illuminated from the transmitter and transmitting antenna subsystem are first biphase demodulated and then are detected in accordance with known FM-CW techniques. The result of the range discrimination thereby obtained during the so-called "monochromatic" signal period of each transmitted frame is to effect Doppler determinations which are relatively unaffected by fixed and moving clutter and various other types of intentional and unintentional interference. That particular immunity is well understood in pseudo-random coded signal technology, but its use in addition to the FM-CW modulation format is novel and productive of heretofore unattained results.

During the FM portion of the transmission, the ambiguities in range determination resulting from the choice of a pseudo-random code word to minimize Doppler ambiguities, may be resolved through the unambiguous range detection capability of the FM portion of the system.

The details of a typical implementation according to the concepts of the invention will be evident as this description proceeds.

DETAILED DESCRIPTION

Figure 1:
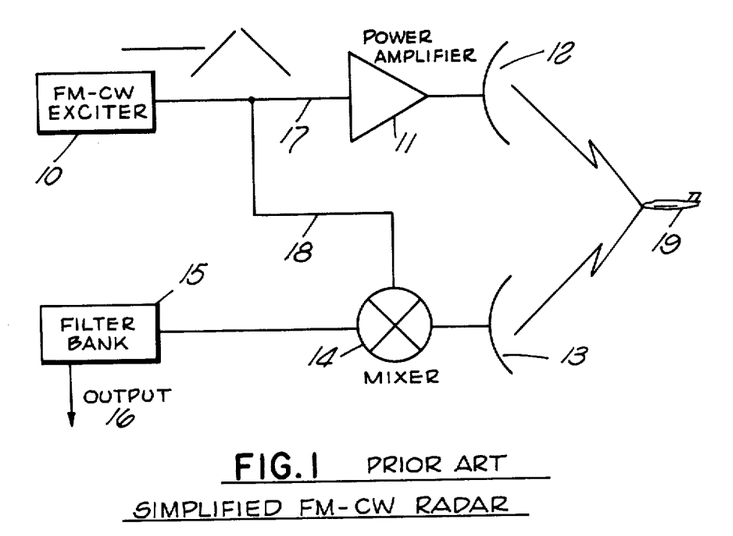
FIG. 1 is a simplified block diagram of a typical FM-CW radar according to the prior art.

Referring now to FIG. 1, a simplified diagram of a typical prior art FM-CW radar system is depicted. An FM-CW exciter 10 produces a series of frames of the transmittable signal in accordance with a typical format illustrated in FIG. 2. Each frame consists of three modes or periods a, b and c. Period a is identified as a monochromatic signal period, during which a constant radio frequency signal $f_o$ is generated. During period b, an upswept ramp is generated with linearly increasing frequency as a function of time, and during period c, substantially the same amount of frequency sweep is effected in a down ramp. The output of 10 would normally be at a low power level; however, the signal on lead 17 is power-amplified in 11 to be transmitted from antenna 12. A reflected or echo signal from a typical target 19 is received by receiving antenna 13 which is mixed in 14 with the output of 10 supplied via lead 18. In mixer 14, the mixing of signals received by antenna 13 with that on lead 18 acting as a local oscillator signal, is accomplished. Accordingly, the signal output from 14 comprises the sum and difference residues. During period a (FIG. 2), the residue is largely due to Doppler frequency components. During periods 3 and 4, frequency differences proportional to target range are also produced. Basically, this is because the FM echo signals entering 13 are time-shifted, vis-a-vis the ramps of mode b and c of the transmitted signal frame. The shift is essentially proportional to target range and provides the basis for range determination.

Typically, the filter bank 15 might be in any of several forms, including the so-called "comb" filter, since the frequency components outputted from 14 discretely represent the target range or ranges. Narrow band filters arranged in a "comb" bank in 15 can thus provide a discrete range identification. The output at 16 may also, in the well-known prior art manner, be representative of target Doppler (velocity) and range discretely.

Referring again to FIG. 2, it will be noted that certain known relationships typical of the FM-CW art are identified for information and further use in describing the novel configuration of the invention.

Figure 2:
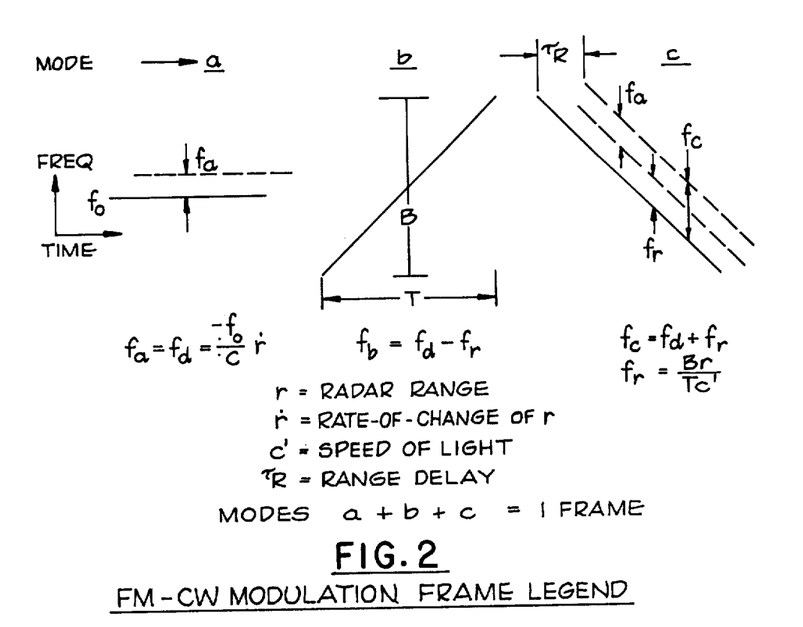
FIG. 2 depicts the waveform with appropriate identifications in a typical modulation frame usable in accordance with the invention.

In accordance with the discussion of FIG. 1, it should be noted that, whereas the "a" Mode or period is used to obtain target radial speed ($\dot{r}$) which is essentially the Doppler frequency $f_d$, the "b" and "c" modes (periods) are used to obtain range information.

Functionally, the operation of the system is relatively simple. The transmitter emits a frequency-modulated wave with a frequency deviation of B, as illustrated on FIGS. 2, at a linear rate of change of approximately B/T Hz per second. The echo signal is heterodyned against the locally generated transmittable signal producing the aforementioned difference frequency; i.e., the discrete frequency which is proportional to the echo delay time or range identified as $f_r$.

The foregoing was basically simplified for the stationary target case; however, the target will ordinarily be moving, and as a consequence, the echo ramp received is modified in frequency by the Doppler shift $f_d$. The conversion process of the receiver during the "b" mode or period therefore produces frequencies $f_b = f_d - f_r$ and $f_c = f_d + f_r$. The differences in sign of $f_r$ in the foregoing two equations is due to the sense of the FM modulation; i.e., up-ramp or down-ramp. In the mode or period "a", $f_a = f_d$, and since $f_d$ is proportional to $\dot{r}$, the value of $\dot{r}$ can be obtained in accordance with $\dot{r} = (-c'/f_o)(f_a)$ wherein c' is the speed of RF propogation (equivalent to the speed of light).

Similarly, $f_r$ is proportional to $\tau_R$ (sweep modes) which is graphically presented on FIG. 2, this being the basic concept for range measurement in an FM-CW radar. From an understanding of FIG. 2 and the foregoing description of the basis for range determination, the equation for range can readily be derived as follows:

$$r = \frac{Tc'}{B}\left(\frac{f_c - f_b}{2}\right).$$

Figure 3:
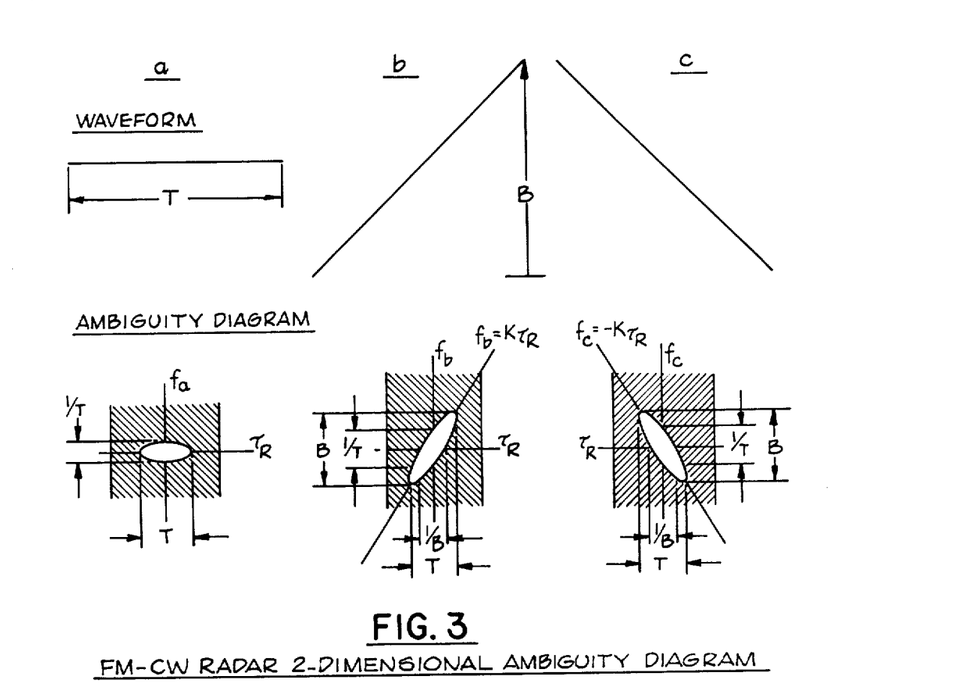
FIG. 3 is a two-dimensional ambiguity diagram for an FM-CW radar.

Some important limitations associated with FM-CW radar of the type hereinabove identified as typical prior art, can best be understood through the use of some simplified two-dimensional ambiguity diagrams. FIG. 3 illustrates, for modes "a", "b" and "c" the nature of ambiguous response plotted in terms of the parameters defined on FIG. 2. Note that, in the monochromatic or CW mode (a), the receiver responds essentially to targets at all ranges, assuming that the transmitter time (i.e., T) for period "a" is long compared to the greatest of the target range delays of interest in the particular case.

In modes "b" and "c", received signals with various combinations of range and Doppler may be detected ambiguously. This gives rise to the range-Doppler coupling problem where, for example, a patch of clutter at zero Doppler and finite range can energize the same final filter as a target with a finite Doppler and a different range.

Figure 4:
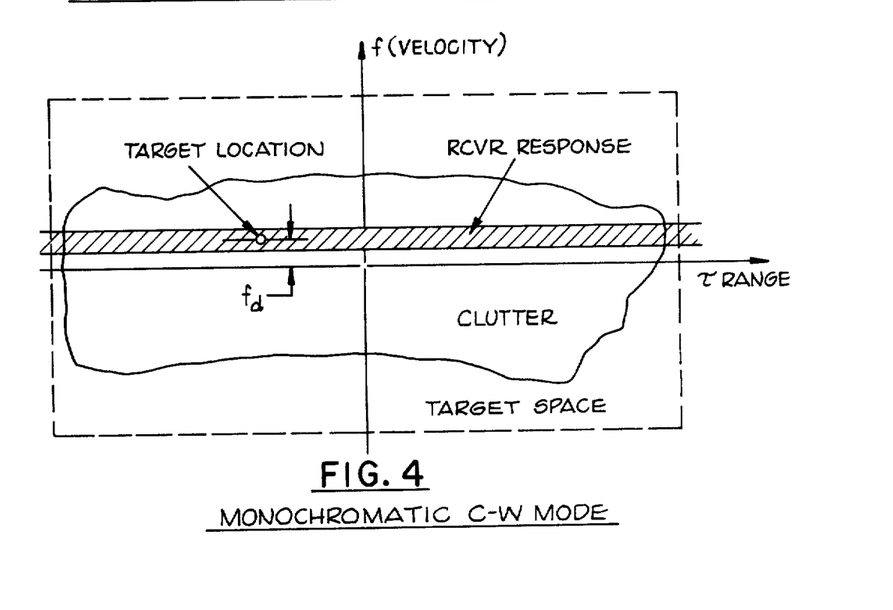
FIG. 4 is a response diagram for the monochromatic mode, period a of FIGS. 2 and 3.

Referring now to FIG. 4, a hypothetical target space is illustrated as bounded in velocity (Doppler) and in range (delay) by the dashed rectangular outline. If it is also assumed that a target has a velocity giving rise to Doppler $f_d$ and that the receiver is tuned to that frequency and matched to the time-on-target, then the receiver response is shown as the shaded horizontal strip, the horizontal center line of which is $f_d$. The width of this strip is equal to the final receiver bandwidth (normally the reciprocal of time-on-target). If it is further assumed that clutter is spread in both range and Doppler as shown by the irregular outline on FIG. 4, then the receiver will respond to all the clutter signals falling within the shaded strip and could (depending upon clutter signal strength) mask the desired target signal at $f_d$.

Figure 5:
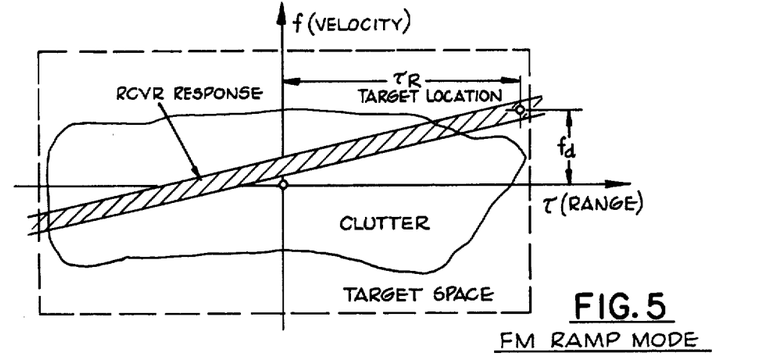
FIG. 5 is a receiver-response diagram for the FM modes, periods b and c of FIGS. 2 and 3.

Referring now to FIG. 5, an equivalent receiver response diagram for modes "b" and "c", the FM ramp modes, is depicted. If it is assumed that the receiver is tuned so it responds to the target $\tau_R$ and $f_d$, as shown, the receiver will then respond to signals from the clutter outline which are also within (intercepted by) the shaded receiver response band. FIG. 5 shows that even if the clutter is at range variance and Doppler from the target, it is capable of causing a response and, again, may mask or corrupt the desired target response.

Figure 6:
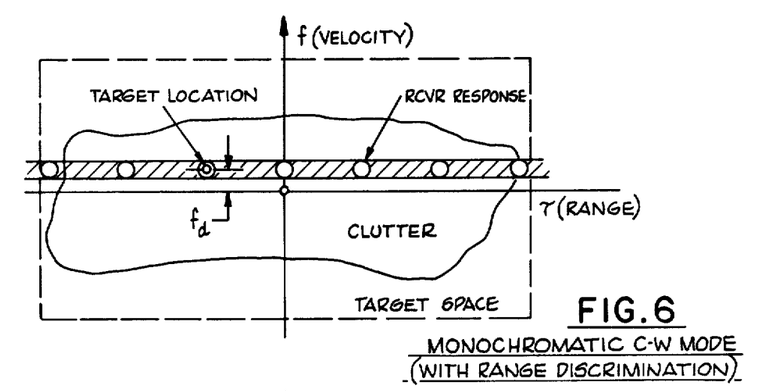
FIG. 6 is a response diagram for the monochromatic mode, period a of FIGS. 2 and 3, with PRC range discrimination added.
Figure 7:
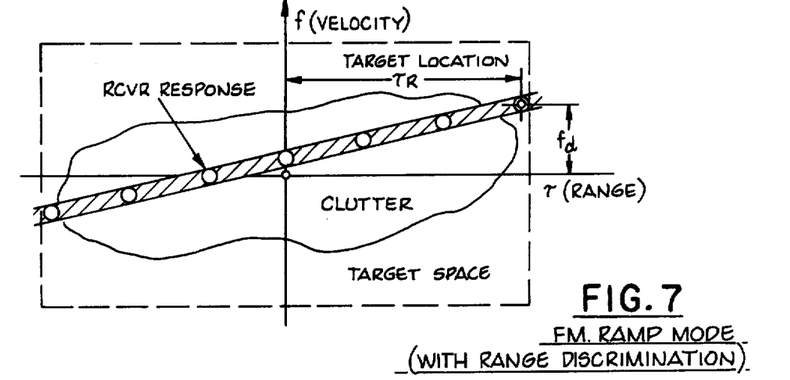
FIG. 7 is a response diagram for periods b and c, the second and third modes as depicted in FIG. 3.

The FM-CW receiver response discussion hereinabove with respect to FIGS. 3, 4 and 5 pertains to a prior art FM-CW radar system. That discussion and those figures are presented in order that the prior art problems may be understood in more depth and the improvement afforded by the invention more fully appreciated. It will now be understood that if, during the monochromatic transmission (modes "a") range discrimination were added, the receiver response to clutter or other interference could be greatly reduced. Such a reduction is illustrated in FIGS. 6 and 7 in which the receiver response at $\tau_R$ and $f_d$ is selected from a number of individual receiver response areas within the bands on FIGS. 4 and 5. The circles of response within that band correspond to individual ambiguous range responses provided by superimposition of pseudo-random coding on mode "a" of the CW-Doppler transmission with appropriate receiver decoding, of course. It will be appreciated that the FM-CW capability acts to select the target circle at the aforementioned $\tau_R$ and $f_d$ coordinates from among the ambiguous responses inherent in the design of a pseudo-random code word duration selected to eliminate Doppler ambiguities. FIGS. 6 and 7 may again be consulted as this description proceeds.

Figure 8:
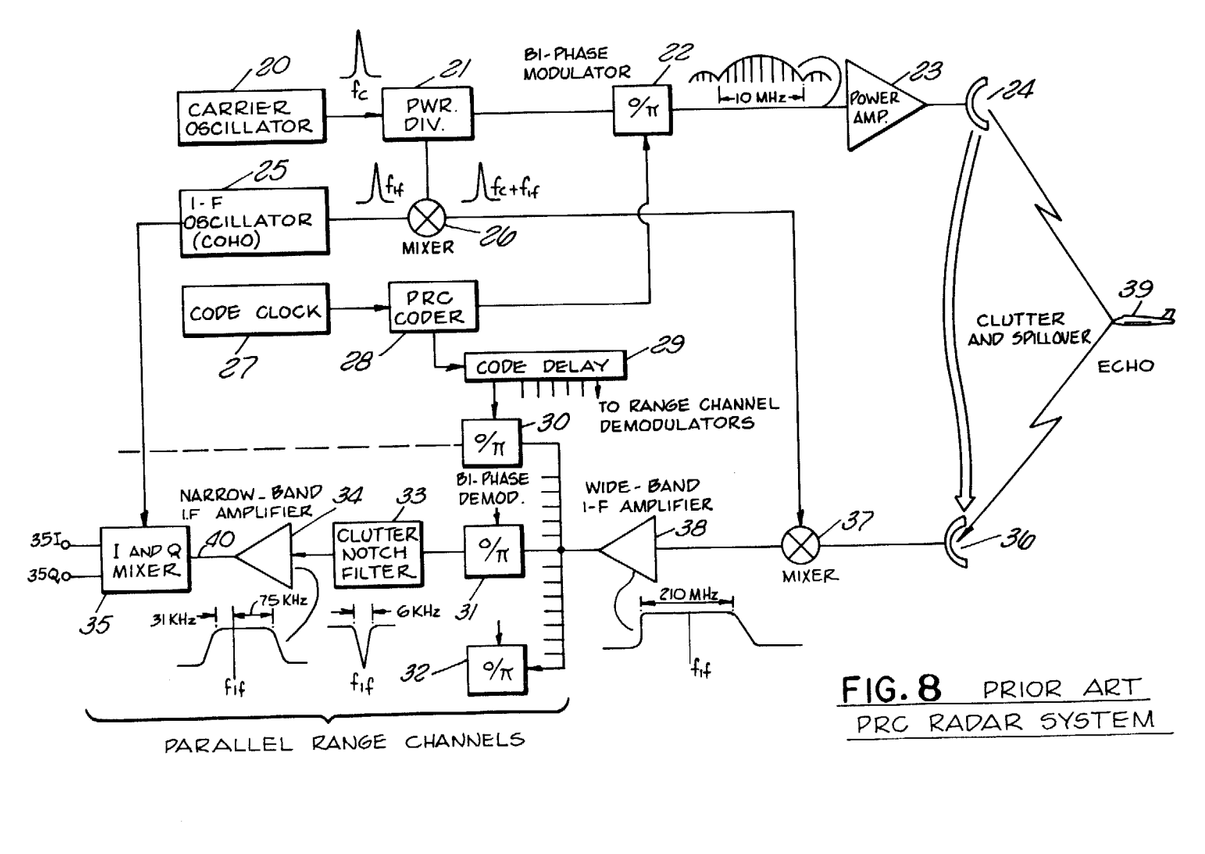
FIG. 8 is a circuit block diagram depicting the configuration of a typical PRC surveillance radar.

Referring now to FIG. 8, a typical prior art pseudo-random-coded radar system is depicted in schematic block diagram form. A carrier oscillator 20 feeds its output through a power divider 21 where a portion of the signal is tapped off and fed through mixer 26, the remainder being supplied to the power amplifier 23 through the biphase modulator 22. The output of power amplifiers 23 is at transmittable power level for excitation of transmitting antenna 24. Coder 28 supplies the code to modulator 22, the code being a series of digital values of one and zero, according to the particular code generated. Modulator 22 then supplies the RF signal to 23 in a first phase for the "one" values from 28 and a second phase or antiphase (180° from the first phase) in response to zero instantaneous code values from 28. A code clock 27 sets the cadence; typically, the clock rate being several megacycles, a 5 megacycle clock rate producing individual code bits of 200 nanoseconds.

Code delay 29 has a number of taps equal to the number of digits in the PRC word, each of these taps being connected discretely to a corresponding biphase demodulator, such as 30, 31 and 32, typically. These biphase demodulators are also responsive in parallel to the output of a wideband IF amplifier 38 at their second inputs. That second or common input signal for the demodulator is mixed downward in 37 from received signals at receiving antenna 36, mixer 26 providing local oscillator signal from the mixing of a stable coherent oscillator (COHO) 25 into mixer 26 against a fraction of the actual transmittable carrier provided by 21.

Each of the biphase demodulators 30, 31 and 32, etc. has circuits at its output comprising a clutter notch filter 33, a narrow band amplifier 34 and, for illustration, and I and Q mixer 35. Only those components following demodulator 31 are illustrated, but it is to be understood that such a series of circuits is extant discretely responsive to the output of each of the demodulators. I and Q mixer 35 has a 35I and 35Q output, it being possible in a known manner to derive these signals as resolved orthogonal components of the signal at 40 by comparison with the phase of COHO 25.

Those skilled in this art will recognize the prior art configuration of FIG. 8 as a purely PRC radar system. In addition to the textbook prior art references hereinbefore cited, U.S. Pat. No. 4,042,925 is useful in understanding the state of the PRC radar system art per se. The so-called clutter notch filter 33 and other aspects of FIG. 8, not fully developed in the textbook prior art, may be better understood from U.S. Pat. Nos. 3,816,829 and 4,012,737.

Figure 9:
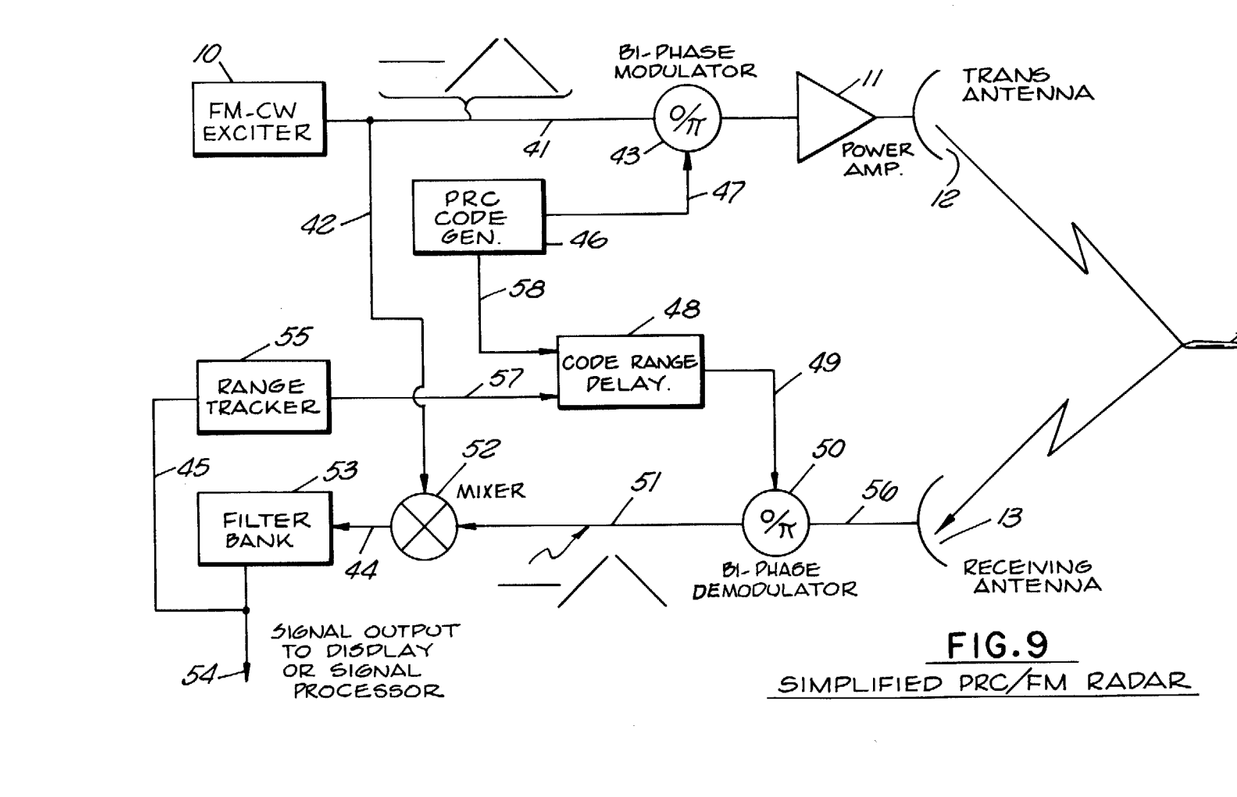
FIG. 9 is a simplified circuit block diagram for an FM-CW radar with PRC range discrimination in accordance with the invention.

Referring now to FIG. 9, a schematic block diagram of an FM-CW radar system with the addition of PRC coding and decoding according to the invention will be described.

The FM-CW exciter 10, the power amplifier 11, and the transmitting and receiving antennas 12 and 13 of FIG. 9 may be essentially identical with those of FIG. 1. The system of FIG. 9, moreover, may be thought of as a basic FM-CW radar system employing the same signal format as contemplated in FIG. 1 and as defined in FIG. 2, except with the addition of the biphase modulation according to the PRC code.

It will be noted that the biphase modulator 43, which is essentially the same as the biphase modulator 22 of FIG. 8 in a purely PRC system, is inserted in the signal path 41 between the FM-CW exciter 10 and the power amplifier 11. Accordingly, the biphase modulation imposed at 43 is essentially superimposed on the FM-CW format extant on 41. PRC code generator 46 may be essentially the same as that of 28 in FIG. 8, a clock block similar to 27 of FIG. 8 being assumed to be incorporated in 46 of FIG. 9. The outputs 47 and 58 of code generator 46 are in the video domain, that on 47 operating to control the biphase modulator 43 to provide zero or 180° RF signals to transmitting antenna 12 through the power amplifier 11. The signal on 58 provides a duplicate of this transmittable code as a reference for the biphase demodulation (correlation) process.

In FIG. 8, a multiple range bin correlation approach is shown for biphase demodulation. That is, the demodulators, of which 30, 31 and 32 are typical, perform their demodulation for successive range "bins" as is well understood in this art. This approach could readily be applied to FIG. 9; however, an alternative approach involving a range tracker 55 operating to effect alignment of the code generated in 48 in accordance with a control signal on 57 is shown. Range tracker 55 may be entirely conventional operating on the output signal of the system extant on 54 and provided via signal lead 45 to the range tracker 55. However the alignment of the local code, as provided on lead 49, is accomplished, the basic operation of the system of FIG. 9 is essentially the same.

Received signals from illumination of target 19 by transmitting antenna 12 enter receiving antenna 13 and via lead 56 are first biphase demodulated in 50. On signal lead 51, the FM-CW signal format still exists, it having survived the PRC demodulation process in 50. Mixer 52 then employs the local FM-CW signal reference on lead 42 against this aforementioned signal on lead 51 to provide a completely demodulated signal on 44. The filter bank 53 may include Doppler filters of the "comb" type (which is a conventional and well understood expedient) and, also, clutter-notch filters, such as 33 of FIG. 8. It will be realized by those skilled in this art that the biphase demodulator 50, mixer 52 and the contents of filter bank 53 would be multiple on a one-channel-per-range-bin basis, as contemplated in FIG. 8, if that particular approach to the demodulation is alternatively to be employed in lieu of the range tracking scheme shown in FIG. 9.

It will also now be realized that the tandem demodulation process between receiving antenna 13 and the final signal output 54 accomplishes the nonambiguous Doppler and range detection depicted graphically in FIG. 7. As previously indicated, the PRC waveform is such that the code word rate must be $1/\tau_w \geq 2f_d$ at least where $f_d$ is a maximum target Doppler expected.

In general, the duration of each mode or period of each FM-CW frame of the transmission format will be longer than the maximum range delay for which the system is designed. For example, for a 100-mile radar system, the unambiguous delay would be approximately 1.25 milliseconds. Appropriate FM-CW periods or modes would each preferably be on the order of 5 milliseconds (plus or minus) in such a system. The ramp deviation in modes "b" and "c" of the FM-CW modulation depends on the range accuracy required but may typically be on the order of 50 kHz (plus or minus). Such a deviation would provide a range resolution of approximately 10,000 feet. That resolution may be thought of as a coarse range determination, the fine range determination being made by the PRC modulation by selection of one of the ambiguous range responses (circles) shown in FIG. 7.

To achieve a desirable order of range discrimination, on the order of 100 feet, for the 200 nanosecond PRC code bit duration, the PRC subsystem bandwidth then must be approximately 5 MHz or about two orders of magnitude greater than the FM-CW waveform bandwidth. Against range distributed clutter, the improvement in range discrimination can produce approximately 20 dB increase in the signal-to-clutter ratio.

It will be appreciated by those skilled in this art once the nature of the invention is fully understood that various modifications and variations are possible within the spirit and scope of the invention. For one, since the process is basically linear, the order of FM-CW and PRC modulations and detection processes could be reversed. Moreover, various other features known in the PRC radar art can be incorporated into the PRC subsystem of the combination of the present invention.

In accordance with the foregoing, the drawings and this description are to be regarded as typical and illustrative only and not intended to limit the scope of the invention.

What is claimed is:

1. In an FM-CW radar system having means for generating and transmitting a continuous wave radio frequency signal and a receiver for continuously receiving echo signals from targets illuminated by said transmitted signal, the combination comprising:

first means for frequency modulating said radio frequency signal in a series of frames each including a monochromatic signal period and at least one period during which the frequency of said signal is varied as a function of time;

second means for generating a pseudo-random coded sequence and for modulating at least a portion of each of said frames with said pseudo-random sequence, said second means being placed in said system with respect to said first means such that said first and second means modulations are applied in a predetermined order;

and third means responsive to said receiver for demodulating both the frequency and pseudo-random modulations extant on said echo signals to provide an output containing unambiguous range and doppler information.

2. Apparatus according to claim 1 in which the arrangement of said first and second means is such that said frequency modulation is first applied to said ratio frequency signal, and said pseudo-random sequence is subsequently applied before said radio frequency signal is transmitted.

3. Apparatus according to claim 1 in which said second means for generating said pseudo-random sequence is adapted for generating the word duration of said sequence in a manner to place the first Doppler ambiguity at an equivalent target velocity greater than the maximum expected target velocity determinable by Doppler signal processing means responsive to the output of said apparatus.

4. A CW radar system comprising:

transmitting and receiving antennas having patterns covering substantially the same spatial sector;

first means for generating a radio frequency signal according to a timed program to produce a repetitive pattern of transmission signal frames, each including a first period during which a monochromatic radio frequency transmission signal is generated, a second period during which the frequency of said transmission signal is varied substantially linearly in a first sense, and a third period during which the frequency of said transmission signal is varied substantially linearly in a second sense, thereby producing frequency modulation during said second and third periods;

second means responsive to the output of said first means for biphase coding the output of said first means according to a repetitive pseudo-random coded sequence having a predetermined word duration and for applying said coded first means output to said transmitting antenna;

third means responsive to said receiving antenna for correlating received echo signals resulting from illumination of targets within said spatial sector by said transmitting antenna against a replica of said biphase coding applied in said second means to produce an output including a range-representing signal during the time of each of said sequence word durations, said range-representing signal retaining the modulation applied during said second and third periods;

and fourth means responsive to said third means output for demodulating received signals containing said frequency modulation to select a range-representing pulse from the output of said third means, said selected pulse unambiguously representing the range of a corresponding target.

5. Apparatus according to claim 4 in which said first means is further defined as generating said transmission signal first, second and third periods all substantially equal in time.

6. Apparatus according to claim 5 in which said first means produces said transmission signals during said second and third periods as increasing frequency and decreasing frequency ramps, respectively, each of said ramps having mean frequency substantially equal to the frequency of said monochromatic signal generated during said first period.

7. Apparatus according to claim 6 in which said second means is further defined as producing said coded word duration at a value which establishes the first Doppler ambiguity at a target velocity in excess of a predetermined maximum system target velocity, thereby producing at least one range ambiguity at a range less than the maximum design range of said system, said fourth means making an unambiguous selection among the ambiguous range-representing pulses of said third means up to a predetermined maximum design range of said system.

8. Apparatus according to claim 4 in which said first means produces said transmission signals during said second and third periods as increasing frequency and decreasing frequency ramps, respectively, each of said ramps having a mean frequency substantially equal to the frequency of said monochromatic signal generated during said first period.

9. Apparatus according to claim 4 in which said second means is further defined as producing said coded word duration at a value which establishes the first Doppler ambiguity at a target velocity in excess of a predetermined maximum system target velocity, thereby producing at least one range ambiguity at a range less than the maximum design range of said system, said fourth means making an unambiguous selection among the ambiguous range-representing pulses of said third means up to a predetermined maximum design range of said system.

10. Apparatus according to claim 9 further defined in that said code generated by said second means is a maximal length pseudo-random sequence.

11. Apparatus according to claim 10 in which delay means are provided for delaying said replica of said biphase coding by an amount corresponding to the range of a target echo signal to be correlated in said third means.

12. Apparatus according to claim 9 in which said third means is adapted to generate said pseudo-random code word of duration $\tau_w$, such that $1/\tau_w \geq 2f_d$, where $f_d$ is the Doppler frequency corresponding to said predetermined maximum system target velocity.

13. Apparatus according to claim 4 further defined in that said code generated by said second means is a maximal length pseudo-random sequence.

14. Apparatus according to claim 4 in which delay means are provided for delaying said replica of said biphase coding by an amount corresponding to the range of a target echo signal to be correlated in said third means.

* * * * *